P. F. LOICHOT.
MEAT GRINDER.
APPLICATION FILED DEC. 24, 1919.

1,350,164.

Patented Aug. 17, 1920.

INVENTOR
Paul F. Loichot
BY: *Freese, Merbel, Agnell & Bond*
ATTYS.

UNITED STATES PATENT OFFICE.

PAUL F. LOICHOT, OF LOUISVILLE, OHIO.

MEAT-GRINDER.

1,350,164.  Specification of Letters Patent.  Patented Aug. 17, 1920.

Application filed December 24, 1919. Serial No. 347,169.

*To all whom it may concern:*

Be it known that I, PAUL F. LOICHOT, a citizen of the United States, residing at Louisville, in the county of Stark and State of Ohio, have invented a new and useful Meat-Grinder, of which the following is a specification.

This invention relates to improvements in meat grinders and more especially to that class of rotary grinders in which the meat is fed by a screw through a perforated plate over one face of which a rotary knife is operated to cut the meat into small particles as it is fed through the perforated plate.

The objects of the invention are to provide a meat grinder of the character referred to so constructed that the operator may, with safety, extend his fingers through the hopper and into engagement with the rotating screw without danger of being injured; to provide a new and practical means of attaching the longitudinally disposed knives which coöperate with the rotating screw; to provide a simple and efficient means for attaching or removing the perforated plate upon the end of the cylinder; and to generally improve and simplify the construction of meat grinders.

With these objects in view the invention consists in the novel construction and arrangement of parts, hereinafter described, illustrated in the accompanying drawings, and particularly pointed out in the appended claims, it being understood that various changes in the form, proportions, size, and minor details of construction may be made without departing from the spirit or sacrificing any of the advantages of the invention.

The invention thus set forth in general terms is illustrated in the accompanying drawings forming part hereof, in which—

A practical embodiment of the invention is disclosed in the accompanying drawings, forming a part of this specification in which similar numerals of reference indicate corresponding parts throughout the several views.

Figure 1:
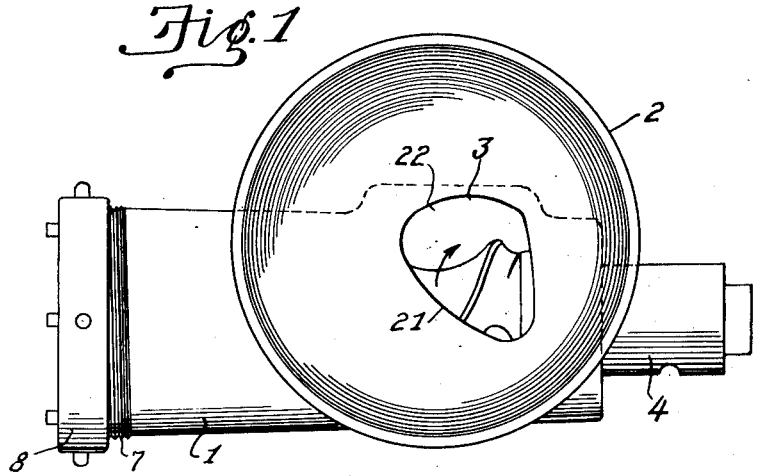
Figure 1 is a plan view of a meat grinder embodying the invention.
Figure 2:
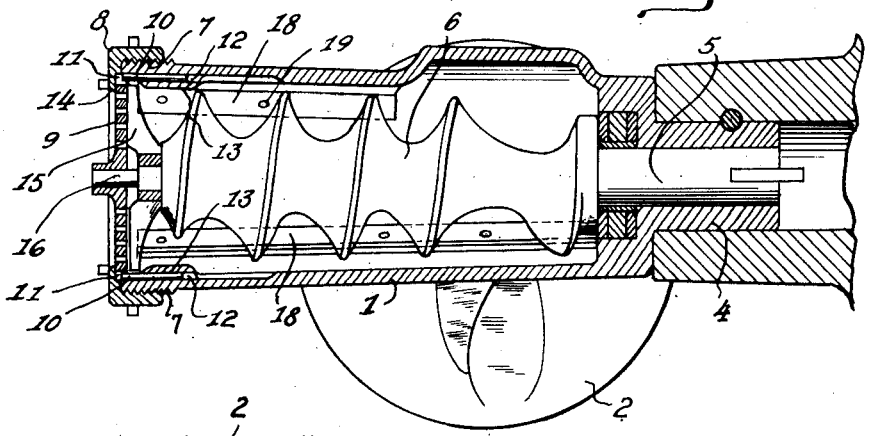
Fig. 2 is a section on line 2—2, Fig. 3.
Figure 3:
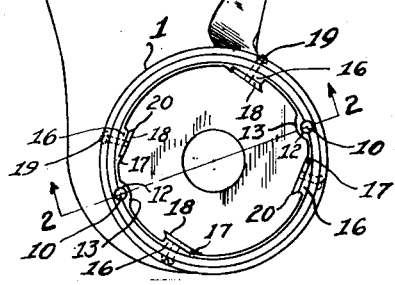
Fig. 3, is an end elevation of the meat grinder with the adjusting or retaining ring, the perforated plate and the rotating screw removed.

Referring more specially to the construction illustrated in the accompanying drawings, the numeral 1 designates the cylinder or barrel of the meat grinder which is provided near one end with the hopper 2, the hopper being located at one side of the longitudinal center of the cylinder or barrel, the lower end of the hopper being provided with a restricted aperture 3 by means of which the hopper communicates with the barrel or cylinder.

The cylinder or barrel is provided at one end with a bearing portion 4 within which the journal portion 5 of the rotating screw 6 is journaled, the other end of the cylinder or barrel being open and provided with external threads 7 to receive the adjusting or retaining ring 8. The perforated plate 9 is located at the open end of the cylinder and held against rotation by means of pins 10 which are passed through suitable notches 11 in the perforated plate and through the bore 12 provided in the integral lugs 13 formed on the interior of the cylinder.

The inwardly disposed annular flange 14 retains the perforated plate upon the end of the cylinder while the pins 10 prevent circumferential movement of the plate. The rotary knives 15 are carried upon the spindle 16 of the rotating screw, which spindle has a bearing in the perforated plate, these knives rotating against the inner face of the perforated plate 9 to cut the meat into small pieces or particles as it is fed forwardly by the rotating screw and passes through the perforations in the plate 9.

The interior of the cylinder or barrel is provided with the longitudinally disposed integral ribs 16 provided with the longitudinal shouldered portion 17 and the longitudinal cutting knives 18 are placed upon the ribs, the rear edges of the knives abutting against the shoulders 17 thereon, screws 19 passing through the knives and through the ribs for the purpose of retaining the knives in fixed relation to the cylinder, the cutting edges 20 of the knives 18 engaging the periphery of the rotating screw 6 in the usual manner.

Attention is now directed to Fig. 1 in which the restricted, substantially triangular aperture 3 is shown in the lower portion of the hopper. The screw is adapted to rotate in the direction indicated by the arrow and it will be noted that the edge 21 of the aperture 3, away from which the screw rotates, is nearly at right angles with the threads upon the screw 6. With this construction, if the fingers of the operator are pushed downwardly into engagement with the screw 6, they will not be injured as the screw will merely move the fingers outwardly along the edge 21 beyond the periphery of the screw and into the pocket 22.

By providing the lugs 13 open inwardly the pins 10 may be easily removed for repairs by driving them entirely through the lugs 13 by means of a punch or other suitable tool. By providing the integral shouldered ribs 16 upon which the knives 18 are mounted, the knives themselves are easily removable and at the same time are held rigidly against movement in contact with the shoulders upon the ribs.

I claim:

1. A meat grinder including a cylinder, a rotatable screw therein and a hopper located at one side of the longitudinal center of the cylinder and communicating with the interior of the cylinder, the inner wall of the hopper at the point of communication being located at nearly a right angle to the threads upon the screw.

2. A meat grinder including a cylinder, a rotatable screw therein and a hopper located at one side of the longitudinal center of the cylinder forming a pocket in the side of the cylinder beyond the periphery of the screw, said hopper communicating with the cylinder, the inner wall of the hopper at the point of communication being located at nearly a right angle to the threads upon the screw.

3. A meat grinder including a cylinder, a rotatable screw therein, longitudinal ribs upon the interior of the cylinder, longitudinal shoulders upon the ribs, longitudinal blades mounted upon the ribs and butting against the shoulders at their rear edges, the cutting edges of the blades coöperating with the screw and means for detachably securing the blades to the ribs.

In testimony that I claim the above, I have hereunto subscribed my name.

PAUL F. LOICHOT.